Sept. 18, 1973 G. W. REINKE 3,759,799
METHOD OF MAKING A METAL PRINTING SCREEN
Filed Aug. 10, 1971 2 Sheets-Sheet 2
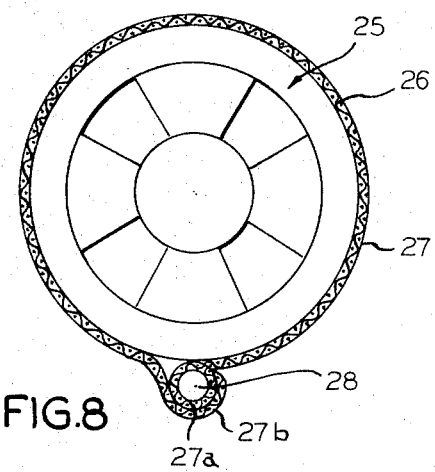
FIG.8
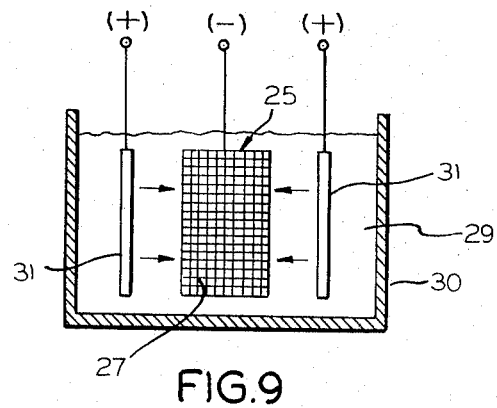
FIG.9
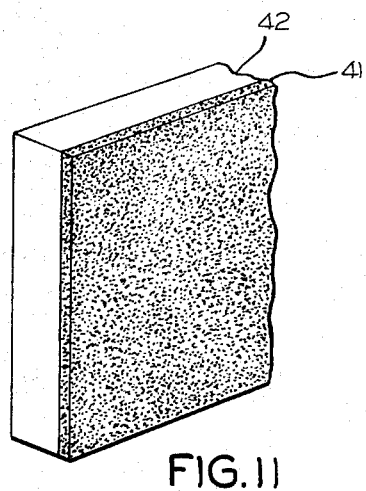
FIG.11
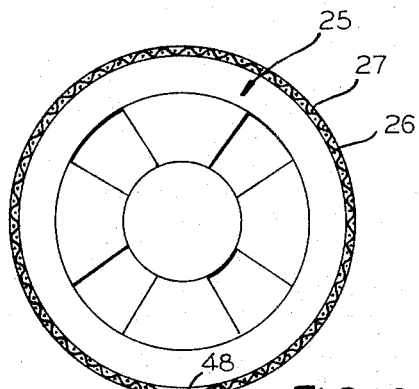
FIG.10
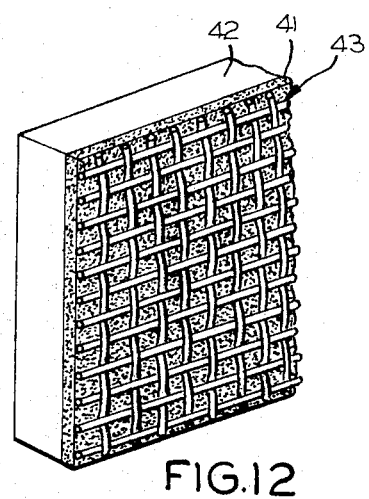
FIG.12
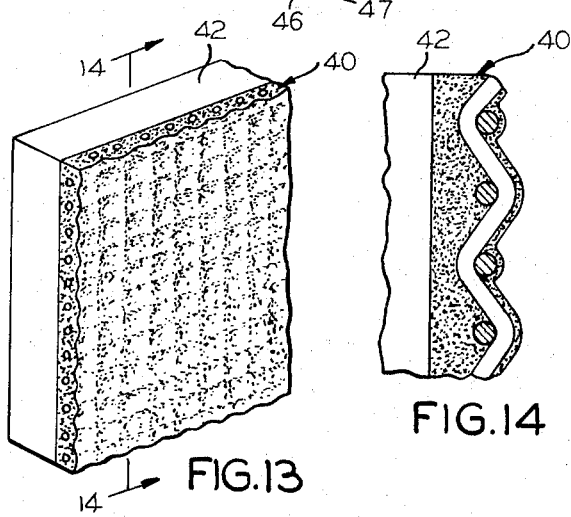
FIG.13
FIG.14
INVENTOR
GEORGE W. REINKE
BY
Kinzer, Dorn & Zickert
ATTORNEYS

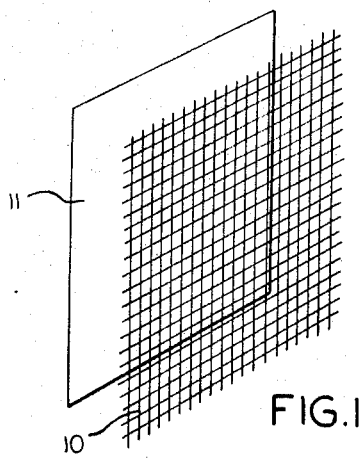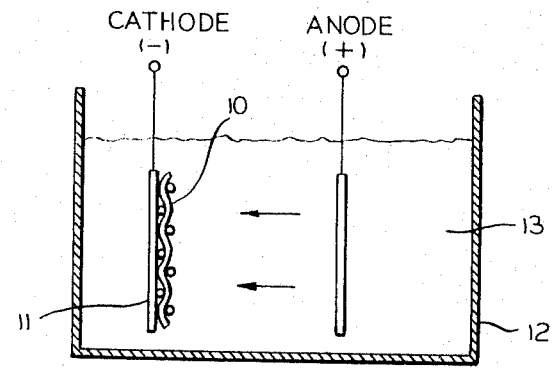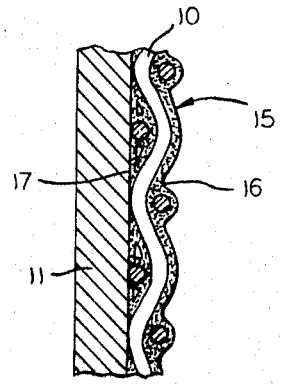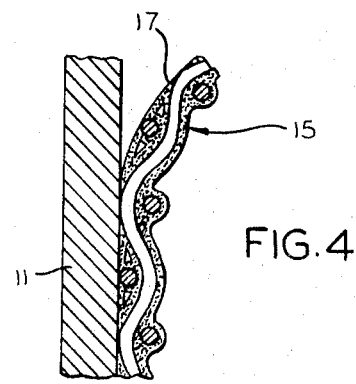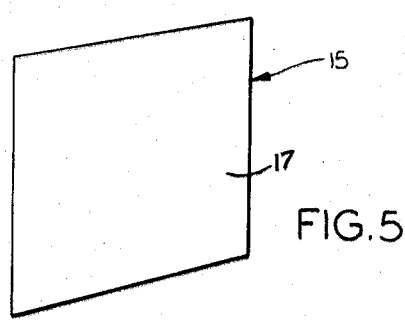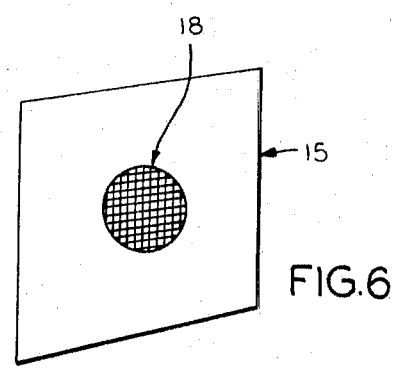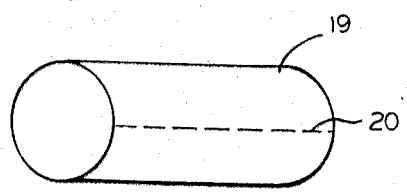

United States Patent Office 3,759,799
Patented Sept. 18, 1973

3,759,799
METHOD OF MAKING A METAL PRINTING SCREEN
George W. Reinke, Crystal Lake, Ill., assignor to Screen Printing Systems, Inc., Cary, Ill.
Continuation-in-part of abandoned application Ser. No. 838,601, July 12, 1969. This application Aug. 10, 1971, Ser. No. 170,529
Int. Cl. C23b 7/02, 7/00; B41c 1/14
U.S. Cl. 204—16
14 Claims

ABSTRACT OF THE DISCLOSURE

An all metal printing screen and a method of making same including the steps of mounting a metal woven wire mesh onto a metal plate, subjecting the wire mesh and plate to an electrolytic action to simultaneouly plate or coat the wire mesh and plate with a metal, and removing the coated wire mesh and plate coating as a unit from the plate to define a continuous smooth surface on one side that may be thereafter etched with a printing pattern to remove the plate coating and open the wire mesh in the printing pattern and define the resist layer. The smoothness of the resist layer and its height above the top threads are closely controlled by the electrolytic plating process.

---

This application is a continuation-in-part of my co-pending application Ser. No. 838,601, filed July 12, 1969 and now abandoned.

This invention relates in general to a method of making a printing screen for use in a screen printing operation, and more particularly to a method of making an all metal printing screen capable of having high resolution and being especially adaptable for use in a rotary printing press where the screen is in cylindrical form.

Heretofore, all metal printing screens have not been satisfactory since either they have not had sufficient strength to withstand normal printing operations or they have been so crude that they had poor printing qualities. In some types, large open printing areas could not be attained. Most of these did not ultilize woven wire mesh, but had a mesh etched from one side of a metal foil and a design etched from the opposite side.

However, with the demand for better resolution and accuracy of print dimensions both laterally and vertically in screen printing operations, the all metal printing screen becomes important as resolution quality is limited by the usual gelatinous pattern defining a resist layer on wire mesh. Moreover, the use of an all metal printing screen on a rotary press is most important, in that rigidity and stability of the screen is necessary, and an all metal screen is also better able to stand formation into a cylindrical shape.

It should be especially appreciated that the printing quality of a woven mesh screen depends largely on two important factors—the smoothness of the resist layer, and its thickness or height above the top threads of the woven mesh. The present invention closely controls these important factors to provide excellent printing quality.

The screen made by the method of the invention is more durable than heretofore known screens and gives superior printing quality, and is believed to be the first all metal printing screen made with woven wire mesh. While this screen is especially useful in cylindrical shape or rotary presses, it may also be used in the conventional flat shape on conventional screen presses utilizing flat screens. And it could be used in parti-cylindrical shape.

The method of making the printing screen of the invention includes the steps of mounting a metal woven wire mesh onto a metal plate or mandrel so that all parts of the screen are in close intimate contact with the metal plate to enhance electrical conduction therebetween and adhesion between the wire and the solid metal film being formed. Preferably, the wire mesh will be of stainless steel and of the taffeta weave type, although any woven wire mesh may be used. The metal plate will preferably be of stainless steel wherein the surface on which the wire mesh is mounted is preferably highly polished. The mesh and plate may be of other materials, as long as they are electrically conductive and made of materials which will part upon completion of the plating operation, since the method of making the printing screen of the invention involves electrolytic plating. The mesh-plate assembly is then submitted to an electrolytic action wherein it is immersed in a suitable electrolyte and connected as the cathode electrode. An electrode connected as the anode is spaced from the mesh-plate assembly, facing the mesh, and current is applied to deposit a coating of metal onto the mesh and plate. As is well known, the coating thickness can be closely controlled in electrolytic plating. One such suitable coating is nickel, and therefore one or more nickel bars may be used as the anodes. In this case the electrolyte is nickel sulfamate. Following the deposition of the nickel coating which deposits a film or coating on the plate and surrounds the threads or wire of the mesh thereby bonding the film to the coating on the mesh, the coated mesh and the film on the plate are peeled together as a unit from the plate to produce the finished printing screen product which is ready to have a printing pattern or resist layer formed on the smooth surface in the film. If it is desired to increase the thickness of the film, it may be thereafter plated to do so. A suitable photomechanical process is thereafter followed to etch a printing pattern or image, wherein the mesh is opened and film is removed in the pattern defining the resist layer.

Another method of making the screen where it is desired to have a film of substantial thickness, such as two to five mils, a plating of that thickness is first formed on the mandrel. The mesh is next mounted onto the plating and then another plating operation bonds the mesh to the first plating formed.

Accordingly, it is an object of the present invention to provide a new and improved all metal printing screen and a method of making same.

Another object of the invention is to provide an all metal printing screen utilizing woven wire mesh.

Another object of this invention is in the provision of a method of making an all metal printing screen for use on screen printing presses, wherein the screen is materially more rigid and dimensionally more stable than conventional screens and heretofore known all metal screens, and which is especially suited for shaping into a cylinder or drum for use on rotary presses.

Another object of the present invention is to provide a new and improved method for making a printing screen that is all metal and which produces better resolution power than conventional screens.

A further object of this invention is to provide a new and improved all metal printing screen capable of giving superior printing quality and having outstanding durability.

A still further object of this invention is in the provision of a method of making an all metal printing screen that works equally well for small or large screens and for screens having small or large open areas, and which may be used in any shape, flat, cylindrical, or otherwise.

Other objects, features and advantages of the invention will be apparent from the following detailed disclosure, taken in conjunction with the accompanying sheets of drawings, wherein like reference numerals refer to like parts, in which:

FIG. 1 is a perspective view of a metal plate and a section of metal woven wire mesh or fabric which together enables the production of a printing screen according to the invention;

FIG. 2 is a vertical sectional view taken through a tank for producing an electrolytic process during the method of making the printing screen of the invention and diagrammatically illustrating the process where the wire mesh is mounted on the plate;

FIG. 3 is an enlarged sectional view taken through the plate and mesh following the deposition of a metal coating thereon from an electrolytic process illustrating the mesh and plate in assembled relation;

FIG. 4 is a view similar to FIG. 3, but illustrating the step of removing the coated mesh and film as a unit from the steel plate;

FIG. 5 is a perspective view of the side of the screen following the electrolytic process which faced the steel plate illustrating the smooth surface formed by the metal plate;

FIG. 6 is a perspective view of the printing screen of the invention and illustrating a printing image or pattern etched therein prior to its being mounted on a printing machine for a screening operation;

FIG. 7 is a perspective view of a printing screen made by the method of the invention and formed in cylindrical shape for use on a rotary press;

FIG. 8 is a top plan view of a cylindrical mandrel plate and woven wire mesh sheet tensioned thereover to provide an assembly for the electroplating process and formation of the printing screen according to the invention;

FIG. 9 is a vertical sectional view taken through a plating tank for producing an electrolytic process in the method of making the printing screen of the invention and diagrammatically illustrating the immersion of the cylindrical mandrel and wire arrangement of FIG. 8;

FIG. 10 is a top plan view of a cylindrical mandrel plate and wire mesh tensioned thereover illustrating another form of means for tensioning the mesh and bringing it into intimate engagement with the plate;

FIGS. 11–13 are fragmentary diagrammatic views of a mandrel plate, platings and mesh illustrating another form and method for making the printing screen according to the invention;

FIG. 14 is an enlarged sectional view taken along line 14—14 of FIG. 13.

A typical screen for screen printing operations consists of a wire or fiber mesh on which a resist pattern or layer has been applied in the form of a lacquer film or a photographic film made up of gelatinous materials. Even the rigidized metal printing screen in my co-pending application Ser. No. 590,811, filed Oct. 31, 1966, now Pat. No. 3,482,300, uses a conventional flow resist to produce the printing image or pattern on the screen. This gelatinous film or coating in the form of a resist layer is characteristic of the type of films having irregularities or roughness at the image edges, which inhibit resolution power and accuracy in printing operations. Moreover, difficulty is encountered in obtaining smoothness in the resist layer and accuracy in thickness or height above the top threads.

The printing screen according to the invention, by virtue of its smooth surface on the printing side having the pattern or image formed therein and the ability to closely control resist layer thickness enables materially better printing quality and resolution. Accordingly, where such high printing quality and resolution is desired, a printing screen of the present invention solves the problem.

The printing screen of the invention includes a conventionally available metal woven wire mesh or fabric of 40 to 325 mesh which has been coated with an electrolytic deposit of metal and provided with a film on one side that is smooth and capable of being etched with a printing pattern to open the mesh in the pattern. An all metal printing screen utilizing woven wire mesh that is self supporting has not heretofore been possible. Preferably the woven wire mesh is of stainless steel and the coating metal is nickel. Although nickel does not normaly adhere well to stainless steel, inasmuch as the coating applied completely surrounds or envelops the mesh, it is firmly attached thereto. A printing pattern or image is thereafter produced on the smooth side of the mesh by conventional photomechanical processes including etching, whereby the mesh is opened in the pattern.

A mesh 10 is illustrated in FIG. 1 in spaced relation from an electrically conductive plate 11. The mesh 10 is of metal and preferably stainless steel, and may be of any desired mesh size, such as 40 to 325 threads to the inch or mesh. For some printing work, a coarser mesh will be desired, and for other work a finer mesh will be desired, but the range of 40 to 325 mesh is the most commonly used in screen printing. While the metal plate 11 used in the method of making the printing screen of the invention may be of any suitable conductive metal, it is preferably of stainless steel because the nickel releases readily from the stainless steel when plating is completed. One side of the plate is preferably polished and constitutes the side against which the wire mesh 10 will be applied, thereby enhancing the parting of the film from the plate and the smoothness of the ultimate resist layer of the screen. For example, the plate 11 may take the form of a stainless steel sheet metal having a thickness of about .030 inch.

In carrying out the invention, the wire mesh 10 is mounted on the polished side of the plate 11 in any suitable manner so that all points of the wire mesh are in intimate contact with the plate to provide good electrical conductivity therebetween and to assure all parts of the wire being bonded to the smooth metal film deposited on the stainless steel plate. The complete assembly of the plate and wire mesh constitutes an electrical conductor and during plating defines one electrode in the electrolytic process.

As shown in FIG. 2, deposition of a metal coating on the wire mesh and plate is carried on in a plating tank 12 having therein a suitable electrolyte 13, wherein the combined wire mesh and plate is immersed in the electrolyte and attached to the cathode contacts of a typical rectifier. A suitable electrolyte for coating of the wire mesh will be nickel sulfamate, and a plurality of nickel bars 14 are also immersed in the bath and connected to the anode contacts of the rectifier by employing a nickel sulfamate plating bath. Metal deposited by electrolysis can be accomplished without inducing strains in the plating.

Application of current to the nickel bars and the combined mesh and plate produces a coating or plating to develop simultaneously on the wire mesh 10 and the steel plate 11. The plating process is carried out by directing the plating toward the wire mesh and the polished side of the plate. When the correct plating time has lapsed, a typical coating thickness on the plate may be about .0005 to .002 inch thick, and during the electrolytic process, this coating will bond to that deposited on the wire mesh, shown particularly in FIG. 3. The heavier coating may be established for coarse meshes while a thinner coating may be established for lighter meshes, and this is controlled in the usual manner as is well known in plating processes. For specific uses the relation of coating weight to mesh count may be reversed to suit the need.

Following the electrolytic process and the plating, the wire mesh 10 and plate are withdrawn from the electrolytic bath 13, and the wire mesh with the coating and the film or deposit bonded thereto and applied to the polished side of the plate 11, is peeled or stripped from the plate, and this constitutes the finished printing screen product which is ready to have a pattern or image established on the side having the smooth surface as established by the plate 11. This screen is generally identified by the numeral 15 in FIGS. 3 to 6, wherein the wire mesh 10 is completely surrounded by a nickel plating or coating 16 which has a smooth surface 17 on the side that faces the plate 11. Surrounding of the wire mesh with the coating rigidifies the mesh in the same manner as disclosed in my aforementioned copending application. FIG. 4 illustrates the separation of the completed screen from the plate 11, this being easily accomplished since the nickel will not strongly adhere to the polished surface of the electrically conductive stainless steel plate 11.

The plating process is carried out until the desired plate thickness is obtained on the plate 11, and this will permit complete surrounding of the threads of the wire mesh where the surface of the smooth layer 16 is almost level with and just barely higher than the highest peaks of the wire mesh. Thus, most of the smooth layer 16 is buried within the mesh or within the interstices of the wire mesh, so that adhesion of the coating to the wire mesh is adequate. The surface 17 is as smooth as the polished surface on the plate 11 thereby enhancing printing quality, and therefore the surface is void of irregularities such as are found on gelatinous types of films formed on wire mesh. Bridging of the gaps between the threads of the wire mesh is straight, thereby avoiding "looping" or "cupping" of the edges which would adversely affect printing.

It may be desirable for certain types of printing to additionally coat or plate the smooth surface 17 with another layer of nickel to increase the resist layer thickness or the height of the film above the top threads of the film. This may especially be desired where it is believed that additional height of the coating above the highest intersecting wires of the mesh is necessary for print quality reasons. In such instances, the smooth surface 17 may be activated and thereafter plated with a coating of one-tenth to one-half mil thickness. It has been found that two to three tenths mil thickness will be sufficient, where a mil refers to .001 inch.

Another form of double plated printing screen may be made by another method which is illustrated generally in FIGS. 11 to 14. The printing screen here shown in completed form in FIGS. 13 and 14, generally indicated by the numeral 40, is made by first plating the mandrel plate to form a first layer, then applying the mesh over the plated layer, and finally again plating to rigidize the mesh and lock it to the first layer of plating. Thereafter, the completed screen is stripped from the mandrel plate.

As seen in FIG. 11, a first layer of plating 41 is applied to the mandrel plate 42 by the usual electroplating process hereinbefore described. It will be understood that FIGS. 11 to 14 are primarily diagrammatic and that the mandrel plate will be cylindrical, as shown in FIG. 8, while being illustrated for diagrammatic purposes as flat, such as in FIGS. 11 to 14. Any desired thickness may be first applied to the mandrel plate, such as between one and five mils. Thereafter, mesh 43 is applied over the first layer of plating 41. It is important here to have all points of the mesh in contact with the plating layer 41 before proceeding, and therefore the mesh must be tightly placed over the first layer on the mandrel by any suitable apparatus, such as that shown in FIGS. 8 and 10. Following the placing of the wire mesh 43, the entire assembly is again subjected to an electrolytic plating process wherein the mesh is plated to rigidize the intersections of the wires and to lock the mesh to the first layer 41, as shown in FIGS. 13 and 14, which defines the completed printing screen identified as 40. Following this step, the printing screen may then be stripped or peeled from the mandrel plate for use.

The completed screen product 15 as shown in FIG. 5 is ready to have an image or pattern formed thereon which may be done by a standard etching process. For example, a photographic resist, such as Eastman Kodak KMER types may be flowed or otherwise applied onto the smooth surface 16 of the screen and suitably processed. A film is exposed to the resist and thereafter developed. The screen is then etched in a suitable etching solution such as ferric chloride or nitric acid. A typical etching machine may be employed which controls the direction of acid application and time of etching. In order to avoid cutting through the nickel coating deposited on the wire mesh from the back side, the back side of the screen 15 may first be protected with a suitable acid etch resist, so that when the etching acid breaks through the smooth top layer 16, the acid will not fan out and undercut the image. FIG. 6 illustrates an image 18 formed on the screen 15, wherein the mesh is opened and through which ink may be applied to define the printing operation. It will be understood that during the printing operation, the squeegee applying ink through the screen will ride on the back side of the screen while the image or pattern will be applied on the front side 16.

The screen made according to the method of the invention may be employed equally well in printing operations needing small or large screens, and where the screens include small or large open areas. The screen is especially desirable for forming drums in rotary screen printing operations, although it is also highly desirable for use in flat form.

An illustrated drum or cylindrically shaped screen is shown in FIG. 7 where opposite edges of the screen are abutted together and suitably connected at a junction line. The screen formed in drum shape is generally indicated by the numeral 19 and the junction of opposite edges is indicated by the dotted line 20. This may be formed in accordance with the method set forth in my copending application, Ser. No. 590,811, or by any other suitable method.

One example of facilitating the mounting of a sheet of woven wire mesh onto a plate is illustrated in FIG. 8. A cylindrical metal mandrel plate 25, having its exterior surface 26 polished, serves as a support for wire mesh in the making of the printing screen according to the invention. A sheet of woven wire mesh 27 is placed around the mandrel plate surface 26. The ends of the woven wire mesh are secured to a tensioning bar 28 that extends parallel to the axis of the mandrel plate and adjacent the polished surface 26. The ends or edges 27a and 27b of the mesh 27 are suitably secured to the tensioning rod 28. Thereafter, the tensioning rod is rotated counter-clockwise, as looking at FIG. 8, to draw the wire mesh tightly about the mandrel plate in tension in order to provide the necessary intimate contact between the wire mesh and the mandrel plate surface so that a satisfactory electrical path is established therebetween, and so that the smooth metal surface and the mesh are joined at all mesh intersections. The mandrel plate may be made of any electrical conducting material, but it is preferable that it be made of stainless steel.

Another mechanical arrangement for mounting the mesh 27 onto the cylindrical mandrel plate 25 is illustrated in FIG. 10 wherein the free ends of the mesh are clamped between clamping devices 46 and 47 having holes therethrough for receiving a plurality of nut and bolt assemblies 48, which when tightened will draw the clamping devices toward each other and effectively tighten the mesh over the mandrel plate into intimate contacting engagement with the surface 26 of the mandrel plate.

As shown in FIG. 9, the mandrel with the wire mesh tensioned thereon is suspended vertically in a plating tank 29 filled with an electrolyte 30, during the plating process and a plurality of bars 31 of anodic material are circumferentially spaced around the mandrel 25. The bars 31 constitute the anodic electrodes, while the mandrel 25 having the wire mesh 27 thereon constitutes the cathodic electrode. Where the mandrel plate and wire mesh is to be coated with nickel, the bars 31 are of nickel and the electrolyte 30 is a nickel sulfamate.

It will be understood that modifications and variations may be effected without departing from the scope of the novel concepts of the present invention but it is under- This invention is hereby claimed as follows:

1. A method of making an all metal printing screen comprising the steps of attaching a sheet of electrically conductive metal woven wire mesh of 40 to 325 mesh count in intimate contact at all points to a polished smooth surface of an electrically conductive metal plate, subjecting the wire mesh and plate to an electrolytic action to electrolytically deposit a coating of nickel simultaneously onto the plate and the wire mesh of a thickness sufficient whereby the coating on the plate joins and bonds to that on the wire mesh and the coating on the mesh completely envelops the wire mesh, removing the coated wire mesh from the plate thereby defining a printing screen having a completely smooth surface on one side defining the printing side where the top of said smooth surface is at least as high as the highest peaks of the wire mesh, and thereafter etching said smooth surface with a desired printing image and define the printing side whereby etching opens the screen in the image.

2. The method as defined in claim 1, wherein the metal plate and wire mesh are stainless steel.

3. The method as defined in claim 1, wherein the coating is deposited about .0003 to .002 inch thick.

4. The method as defined in claim 1, and the step of photographically producing a printing image on said smooth surface.

5. A printing screen made in accordance with the method of claim 1.

6. The method as defined in claim 1, and production of a printing image on said smooth surface including the steps of applying a photographic resist onto said smooth surface, exposing the resist to a film having the desired copy, development of the image thereby leaving a resist pattern, and etching of said smooth surface to remove the metal around the resist pattern and open the screen where the metal is removed to define an etched image on said smooth surface.

7. The method as defined in claim 6, and applying an etch resist to the side of the screen opposite said smooth surface prior to the step of etching.

8. The method as defined in claim 1, and applying a coating of nickel at least .0001 inch thickness onto the smooth surface prior to etching a printing image to increase the height of the nickel on the printing side above the highest peaks of the wire mesh.

9. A method of making a self-supporting printing screen adapted to have a printing image etched thereon and be employed in a screen printing press, said method comprising the steps of mounting an electrically conductive metal woven wire mesh onto a smooth surfaced electrically conductive plate in electrical contact therewith, wherein the wire mesh includes wires crossing each other defining apertures, subjecting the plate and wire mesh to an electrolytic action to electrolytically deposit a coating of metal onto said wire mesh and the side of the plate engaging the wire mesh of a thickness to completely cover the plate and wire mesh thereby locking the wires together at their intersections and closing the apertures and defining a smooth surface on one side, peeling the coated wire mesh and coating on the plate from the plate, etching a pattern on the smooth surface thereby opening the apertures within the pattern, shaping the screen into a cylinder so that the end edges abut and define a joint, and joining the abutting edges together.

10. A method of making a self-supporting printing screen adapted to have a printing image etched thereon and be employed in a screen printing press, said method comprising the steps of mounting a sheet of electrically conductive metal woven wire mesh under tension on an electrically conductive cylindrical mandrel plate and in electrical contact therewith, wherein the wire mesh includes wires crossing each other defining apertures, immersing the mandrel plate into an electroylte and subjecting the wire mesh and mandrel plate to an electrolytic action to electrolytically deposit a coating of metal simultaneously onto the mandrel plate and the wire mesh of a thickness to completely cover the plate and wire mesh thereby locking the wires together at their intersections and closing the apertures and defining a smooth surface one side the top of which is at least as high as the highest peaks of the wire mesh, removing the coating wire mesh and coating on the mandrel plate from the mandrel plate, and etching the smooth surface with a desired printing image to open the apertures in the image and define the printing side thereof.

11. The method of making all metal self-supporting printing screen adapted to have a printing image etched thereon and be employed in a screen printing press, said method comprising the steps of electrolytically depositing a first layer of nickel onto a smooth surfaced mandrel plate, mounting a metal woven wire mesh of 40 to 325 mesh count having wires crossing each other defining aperatures extending therethrough onto the first layer by tightly stretching same thereon so that all points along the mesh are in intimate contact with the first layer, electrolytically depositing a second layer of nickel over the mesh onto the first layer thereby locking the wires together at their intersections and locking the mesh onto the first layer an ddefining a printing screen having a smooth printing surface on the side formed against the mandrel plate where the top of the smooth surface is higher than the highest peaks of the wire mesh, and removing the screen from the mandrel plate.

12. The method of claim 11, wherein the mesh is of stainless steel.

13. The method of claim 11, wherein the thickness of said first layer is at least one tenth mil and the thickness of said second layer is at least three tenths mil.

14. The method of claim 13, and further including the step of etching a printing image through the smooth surface to open the apertures of the mesh in the image.

References Cited

UNITED STATES PATENTS

| | | | |
|---|---|---|---|
| 2,395,448 | 2/1946 | Brennan et al. | 101—128.2 |
| 2,316,768 | 4/1943 | Brennan et al. | 101—128.4 |
| 2,419,028 | 4/1947 | Norris | 204—11 |
| 577,070 | 2/1897 | Sandham | 204—24 |
| 3,614,822 | 10/1971 | Brown | 204—16 |
| 1,243,655 | 10/1917 | Clark | 204—24 |
| 2,042,030 | 5/1936 | Tainton | 204—24 |
| 3,482,300 | 12/1969 | Reinke | 204—16 |

THOMAS M. TUFARIELLO, Primary Examiner

U.S. Cl. X.R.

101—127, 128.4; 204—9, 11

UNITED STATES PATENT OFFICE
CERTIFICATE OF CORRECTION

Patent No. 3,759,799           Dated September 18, 1973

Inventor(s) George W. Reinke

It is certified that error appears in the above-identified patent and that said Letters Patent are hereby corrected as shown below:

```
Col. 1, line 66, change "or" to --on--;
Col. 2, line 24, change "wire" to --wires--;
Col. 3, line 43, after the semi-colon insert --and--;
Col. 8, line 9, change "electroylte" to --electrolyte--;
       line 15, after "surface" insert --on--;
       line 17, change "coating" to --coated--; and
       line 35, change "an ddefining" to --and defining--.
```

Signed and sealed this 16th day of April 1974.

(SEAL)
Attest:

EDWARD M. FLETCHER, JR.                C. MARSHALL DANN
Attesting Officer                      Commissioner of Patents